No. 820,341. PATENTED MAY 8, 1906.
E. S. BEDFORD.
INSECTICIDE TRAP.
APPLICATION FILED JUNE 14, 1905.

Witnesses
J. W. Stauffer
A. Allgier.

Inventor
Ebenezer S. Bedford
By Ichiel J. Cilley
Attorney

UNITED STATES PATENT OFFICE.

EBENEZER S. BEDFORD, OF GRAND RAPIDS, MICHIGAN, ASSIGNOR OF ONE-HALF TO JOHN R. HUNZICKER, OF GRAND RAPIDS, MICHIGAN.

INSECTICIDE-TRAP.

No. 820,341.     Specification of Letters Patent.     Patented May 8, 1906.

Application filed June 14, 1905. Serial No. 265,277.

*To all whom it may concern:*

Be it known that I, EBENEZER S. BEDFORD, a subject of King Edward VII of England, residing at Grand Rapids, in the county of Kent and State of Michigan, have invented certain new and useful Improvements in Insecticide-Trays, of which the following is a specification.

My invention relates to improvements in trays for trapping or catching flies and other insects that infest dwellings, restaurants, &c.; and its objects are, first, to provide a tray that will be neat, compact, and convenient; second, to provide a tray in which either sticky fly-paper or liquid fly-poison may be used without exposing it to view, and, third, to provide a tray that may, if desired, be used for supporting a tea or coffee pot or other dish on a table at the same time that it is being used for catching flies, &c. I attain these objects by the mechanism illustrated in the accompanying drawings, in which—

Figure 1:
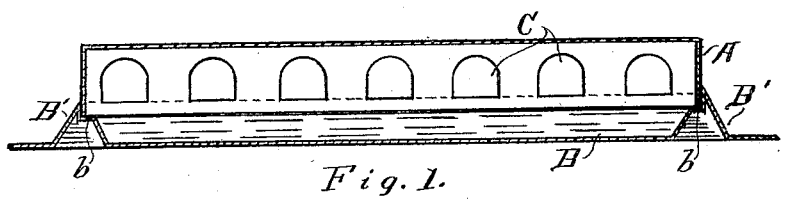
Figure 2:
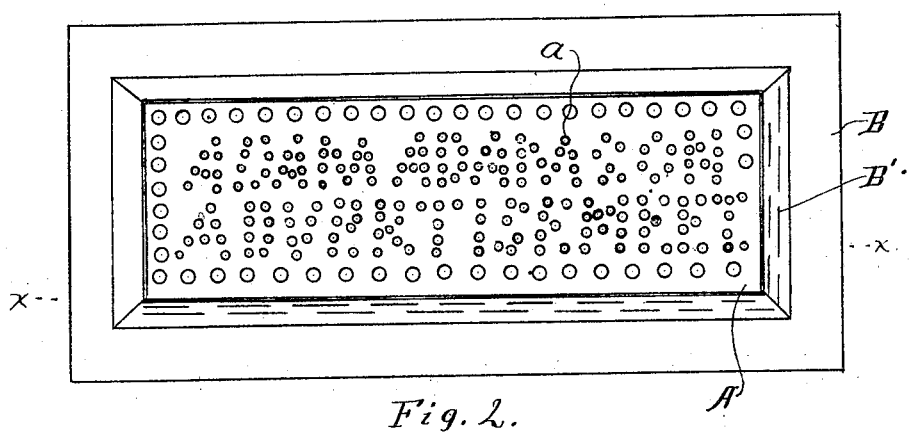
Figure 3:
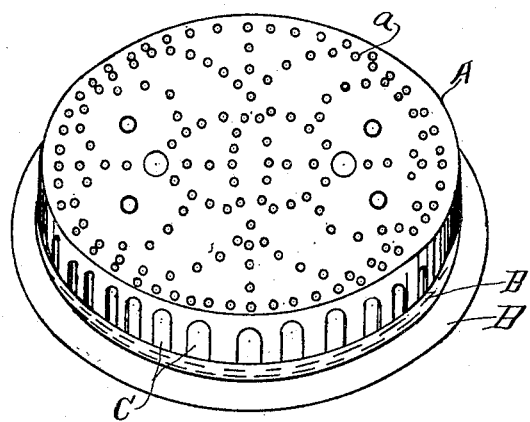

Figure 1 is a sectional elevation of a rectangular tray on the line X X of Fig. 2. Fig. 2 is a plan of a complete tray; and Fig. 3 is a perspective of a round tray, illustrating that I do not restrict myself to any special form of tray for the use indicated.

Similar letters refer to similar parts throughout the several views.

This tray consists of the base or basin B, which is formed with an upwardly-projecting incline B', which is provided with an offset shoulder *b* for the reception and support of the screen or top portion A, and a basin is formed within the projecting projections below the shoulders *b* for the reception of sheets of sticky paper or liquid fly-poison, insect-powder, or any other insecticide desired.

The screen A is made in the form of an inverted bake tin or basin and of a size to closely fit within and upon the ledge or shoulder *b* to form a close joint thereon and is provided with openings C, the lower walls of which are just high enough to extend from the shoulder *b* to the top of the incline B', so that an insect climbing up this incline will meet no obstruction to passing directly through said openings into screen and in contact with the insecticide. I prefer that the top of this screen be perforated in an artistic manner for two purposes—namely, first, to render the inside of the tray and screen perfectly light, and, second, to enable the manufacturer, if he so desires, to render the top of the screen as sightly as possible, as indicated at *a* in Figs. 2 and 3. When this tray and screen are properly constructed, the insecticide may be placed in it, and it may be placed in any position or place desired without being unsightly or danger of outside articles coming inconveniently in contact with the contents of the tray, and a tea or coffee pot or other dish may be placed upon it as a standard without rendering it in any degree obnoxious to the most fastidious, and when it is desired to empty it this can be conveniently done by simply removing the screen.

Having thus fully described my invention, what I claim as new, and desire to secure by Letters Patent of the United States, is—

1. In an insecticide-tray, a basin formed of sheet metal, with upwardly-projecting inclined walls having a shoulder thereon, and a screen resting upon said shoulder and having openings in its sides, substantially as and for the purpose set forth.

2. In an insecticide-tray, a basin having upwardly-projecting inclined walls, a shoulder formed in the inner incline, a screen having a flat top and downwardly-projecting sides arranged to rest on said shoulder and having openings immediately above the upper edge of the inclined wall, and with small apertures through the top of the screen, substantially as and for the purpose set forth.

Signed at Grand Rapids, Michigan, June 8, 1905.

EBENEZER S. BEDFORD.

In presence of —
    I. J. CILLEY,
    A. ALLGEER.